US009875086B1

(12) United States Patent
Anderson et al.

(10) Patent No.: US 9,875,086 B1
(45) Date of Patent: Jan. 23, 2018

(54) OPTIMIZING PERFORMANCE OF APPLICATIONS DRIVEN BY MICROSERVICES ARCHITECTURE

(71) Applicant: International Business Machines Corporation, Armonk, NY (US)

(72) Inventors: Eric M. Anderson, Friendswood, TX (US); Szymon W. Harat, Krakow (PL); Michal P. Malczewski, Gliwice (PL); Artur Szczotka, Bielsko-Biala (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/279,598

(22) Filed: Sep. 29, 2016

(51) Int. Cl.
G06F 9/44 (2006.01)
G06F 15/173 (2006.01)
G06F 15/177 (2006.01)
G06F 9/445 (2006.01)

(52) U.S. Cl.
CPC .......... G06F 8/20 (2013.01); G06F 8/60 (2013.01); G06F 8/77 (2013.01)

(58) Field of Classification Search
CPC ....................................................... G06F 8/20
USPC ........................................................ 717/104
See application file for complete search history.

(56) References Cited

U.S. PATENT DOCUMENTS 6,061,722 A * 5/2000 Lipa ..................... G06F 11/3495
707/999.002
7,055,052 B2 * 5/2006 Chalasani ........... G06F 11/0709
709/221
7,693,983 B1 * 4/2010 Gupta ..................... H04L 12/14
709/221
2004/0205101 A1 10/2004 Radhakrishnan
2007/0112574 A1 * 5/2007 Greene ................. G06F 9/5072
340/572.1

(Continued)

FOREIGN PATENT DOCUMENTS

CN 105162884 12/2015

OTHER PUBLICATIONS

Ali Anwar, Anca Sailer, Andrzej Kochut, and Ali R. Butt. 2015. Anatomy of Cloud Monitoring and Metering: A case study and open problems. In Proceedings of the 6th Asia-Pacific Workshop on Systems (APSys '15). ACM, New York, NY, USA, Article 6, 7 pages. DOI=http://dx.doi.org/101145/2797022.2797039.*

(Continued)

Primary Examiner — James D Rutten
(74) Attorney, Agent, or Firm — VanLeeuwen & VanLeeuwen; David B. Woycechowsky

(57) ABSTRACT

An approach is provided in which an information handling system deploys a first microservice included in an application to a first microservice runtime environment (MRE). The information handling system receives a first set of performance metrics corresponding to a performance level of the first microservice in the first MRE, and receives a second set of performance metrics corresponding to a second MRE. Then, the information handling system determines that the first microservice will have a higher performance level in the second MRE than in the first MRE based on comparing the first set of performance metrics against the second set of performance metrics. As a result, the information handling system redeploys the first microservice from the first MRE to the second MRE.

10 Claims, 6 Drawing Sheets

(56) References Cited

U.S. PATENT DOCUMENTS

| | | |
|---|---|---|
| 2009/0113327 A1* | 4/2009 | Pogrebinsky ............. G06F 8/61 715/765 |
| 2009/0249287 A1 | 10/2009 | Patrick |
| 2010/0049851 A1* | 2/2010 | Garrison ............... G06F 9/5061 709/226 |
| 2010/0299437 A1* | 11/2010 | Moore ................ H04L 67/1008 709/226 |
| 2016/0112475 A1 | 4/2016 | Lawson et al. |
| 2016/0124742 A1 | 5/2016 | Rangasamy et al. |

OTHER PUBLICATIONS

A. Brunnert et al. Performance-oriented DevOps: A Research Agenda. Technical report, SPEC Research Group, Aug. 2015, accessed online at <research.spec.org/fileadmin/user_upload/documents/wg_devops/endorsed_publications/SPEC-RG-2015-001-DevOpsPerformanceResearchAgenda.pdf>.*

Mueller, "Performance Issue Considerations for Microservices APIs," SmartBear, Mar. 2015, 4 pages.

Sousa et al., "Automated Setup of Multi-Cloud Environments for Microservices-Based Applications," 9th IEEE International Conference on Cloud Computing, Jun. 2016, San Francisco, United States, May 2016, 9 pages.

* cited by examiner

OPTIMIZING PERFORMANCE OF APPLICATIONS DRIVEN BY MICROSERVICES ARCHITECTURE

BACKGROUND

A microservices architecture involves the design of an application as a suite of independently deployable, small, modular services, which are typically referred to as "microservices." Each microservice executes a unique process and communicates through a well-defined, lightweight mechanism to serve a business goal using communication protocols. The microservices architecture has become a preferred way developing software systems, particularly those that operate in cloud-based environments.

Microservices may be deployed on a wide variety of cloud environments provided by different service providers. The service providers provide microservice runtime environments (MREs), which are runtime environments that execute deployed microservices. A service provider may offer different types of MREs that are configured to support various types of microservices. For example, a service provider may provide a database MRE that is data intensive, and an application MRE that is processing intensive. In turn, the service provider executes an application's microservices using MRE types corresponding to the microservices' requirements.

Some terminology will now be defined. As used herein, the term "microservice" refers to any software construct that: (i) is completely embodied in the code of a software program (as opposed to being code that is called by the software program from code that is not included in the software program itself; and (ii) is architecturally similar in its structure and context to a traditional service (may sometimes herein be referred to as a "macroservice") used in SOA (service oriented architecture). While microservices are typically smaller than macroservices, there is not a determinative size limitation on the size of a "microservice."

BRIEF SUMMARY

According to one embodiment of the present disclosure, an approach is provided in which an information handling system deploys a first microservice included in an application to a first microservice runtime environment (MRE). The information handling system receives a first set of performance metrics corresponding to a performance level of the first microservice in the first MRE, and receives a second set of performance metrics corresponding to a second MRE. Then, the information handling system determines that the first microservice will have a higher performance level in the second MRE than in the first MRE based on comparing the first set of performance metrics against the second set of performance metrics. As a result, the information handling system redeploys the first microservice from the first MRE to the second MRE.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
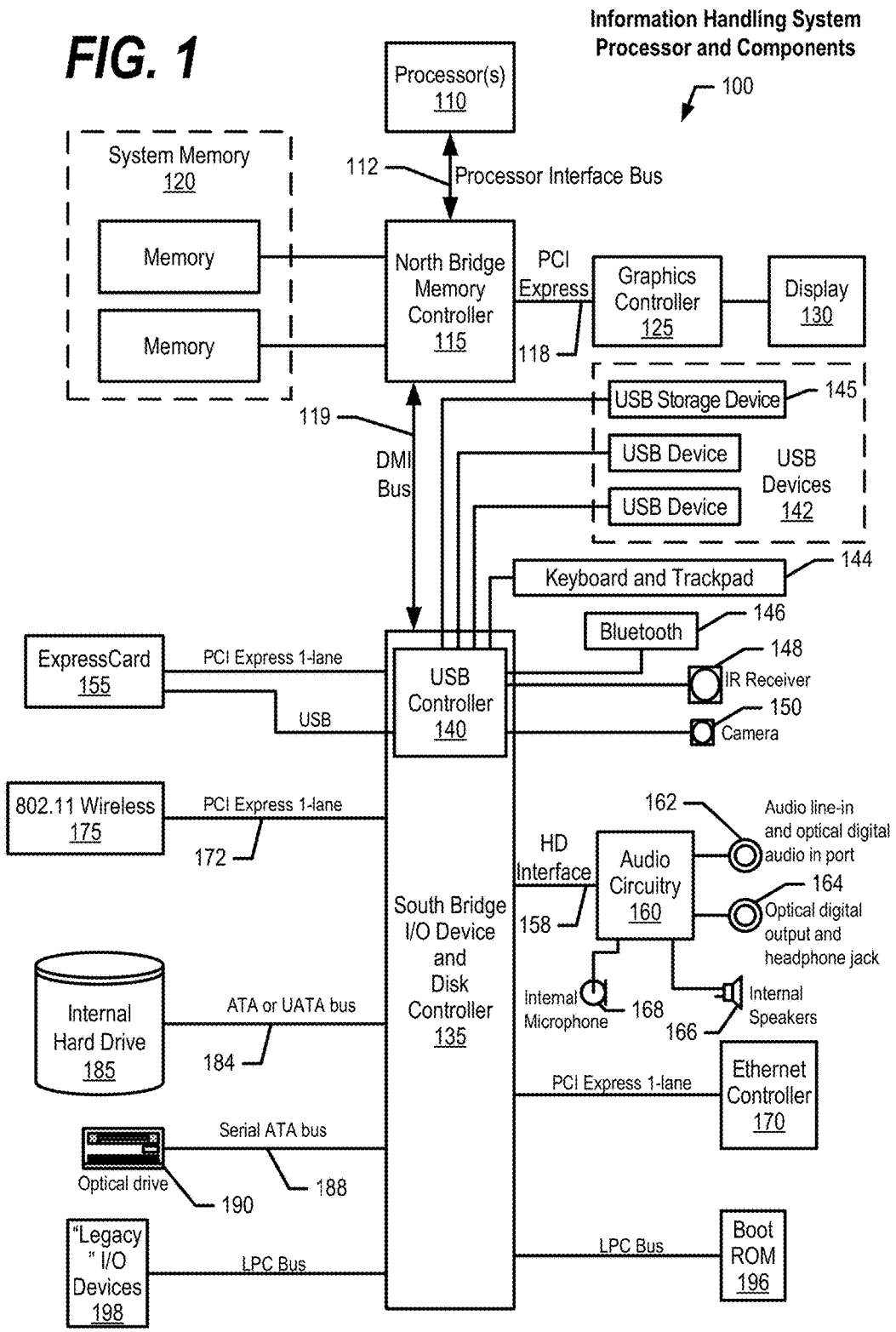
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
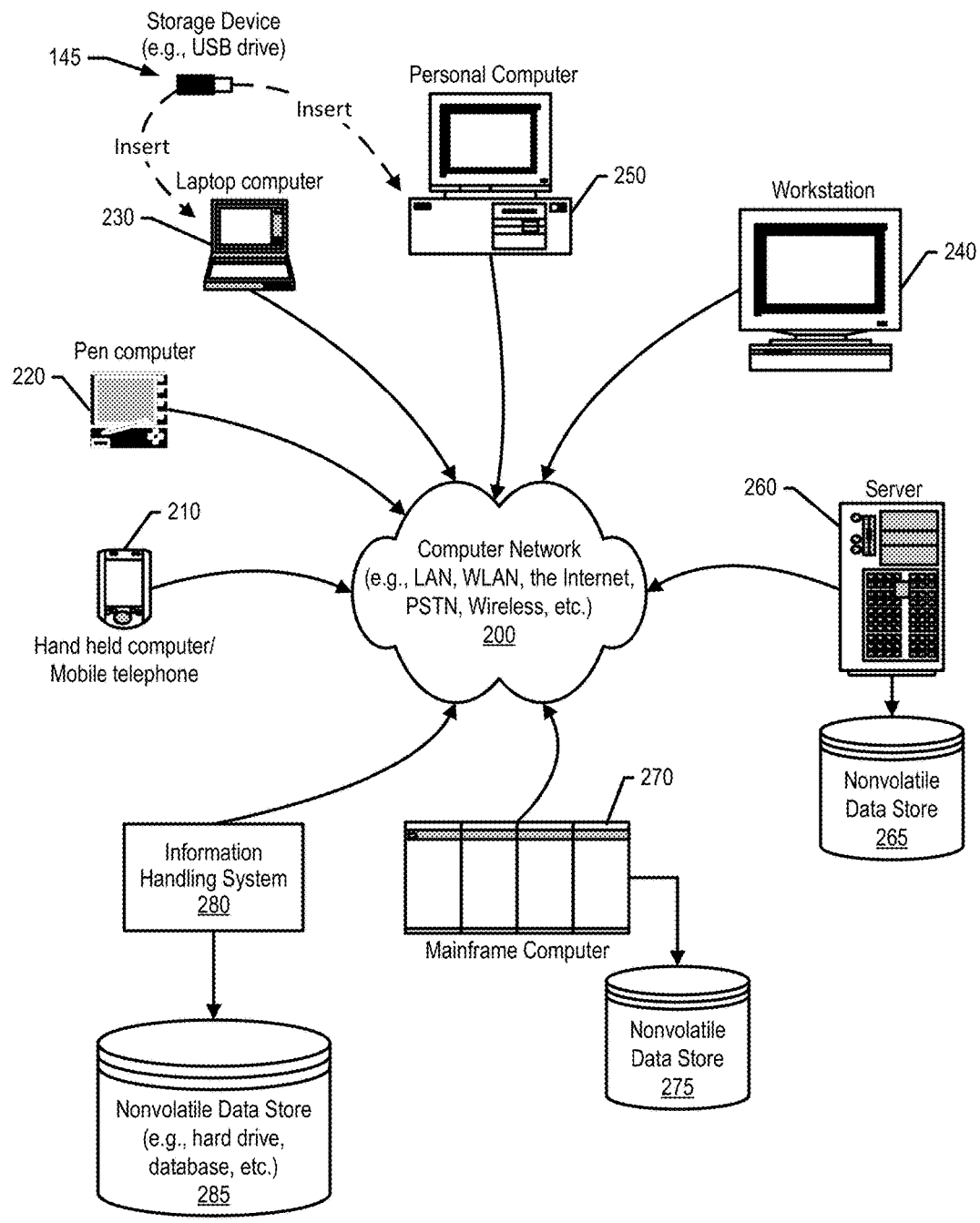
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 7 depict an approach that can be executed on an information handling system to optimize performance of microservices architecture-based applications. As discussed previously, an application's microservices may be deployed on a wide variety of different service providers over a wide variety of locations. A challenge found with the traditional microservices deployment process is that latency and overall application performance issues arise because of the wide spread deployment, particularly when two microservices that are dependent upon each other are executing in microservice runtime environments that are physically separated by large distances. Because software developers typically do not have direct control over the deployment stage, the software developers also have no direct insight to the application's performance until the application's microservices are actually deployed to their respective microservices runtime environments (MREs).

To alleviate at least the above-mentioned issues, the information handling system disclosed herein analyzes deployed microservices and redeploys those microservices to different microservices runtime environments as needed to optimize overall application performance.

The information handling system retrieves service data records from cloud providers that provide microservice runtime environments (MREs). The service data records include performance metrics such as a site identifier (ID), service ID, location data, and performance data such as latency and transactions per second. The information handling system uses an application's application configuration information to cluster the service data records on a per application basis. Once the information handling system clusters the service data records by application, the information handling system determines whether an application's overall performance would increase if some of its microservices were redeployed from their existing MREs to different MREs, such as a different MRE that is closer in proximity to a dependent microservice. In turn, the information handling system redeploys the microservices accordingly to increase overall application performance.

Figure 3:
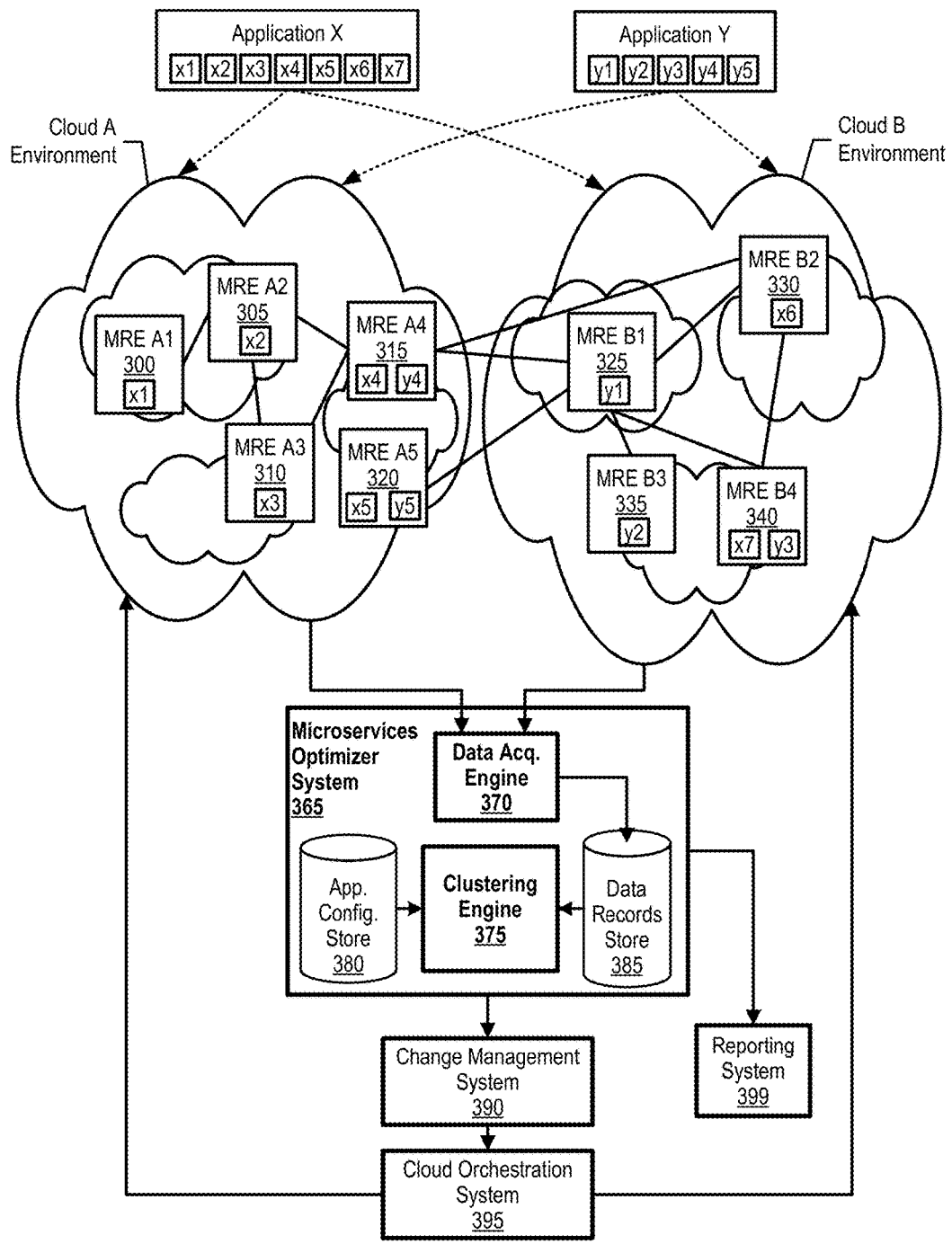
FIG. 3 is an exemplary diagram depicting a microservices optimization system that monitors microservices performances and redeploys underperforming microservices to better suited microservice runtime environments.

FIG. 3 is an exemplary diagram depicting a microservices optimization system that monitors microservices performances and redeploys the microservices to increase overall application performance. FIG. 3 shows two cloud provider environments A and B provided by different service providers A and B. Application X includes microservices x1, x2, x3, x4, x5, x6, and x7, which are deployed on microservice runtime environments (MREs) A1 300, A2 305, A3 310, A4 315, A5 320, B2 330, and B4 340 respectively. As can be seen, application X's microservices are serviced by both cloud A provider and cloud B provider. Application Y includes microservices y1, y2, y3, y4, and y5, which are deployed on MREs B1 325, B3 335, B4 340, A4 315, and A5 320 respectively. As can be seen, application Y's microservices are also being serviced by both cloud A provider and cloud B provider. As those skilled in the art can appreciate, more or less cloud providers, applications, and/or microservices may be utilized than what is shown in FIG. 3.

Microservices optimizer system 365 initially stores application configuration information for each application in application configuration store 380. The application configuration information includes each application's configuration information such as a list of the application's microservices, the MRE on which each application is deployed, dependencies and constraints on the microservices, measures to consider when optimizing the application (e.g., MRE location), etc.

Microservices optimizer system 365 includes data acquisition engine 370, which collects service data records from each cloud service provider according to the deployed microservices. Data acquisition engine 370 is cloud independent and, in one embodiment, uses relevant application program interfaces (APIs) exposed by the cloud providers to collect the service data records. In one embodiment, the service data records include site IDs, service IDs, location data, and MRE performance data such as latency and transactions per second. Data acquisition engine 370 stores the service data records in data records store 385.

Figure 4:
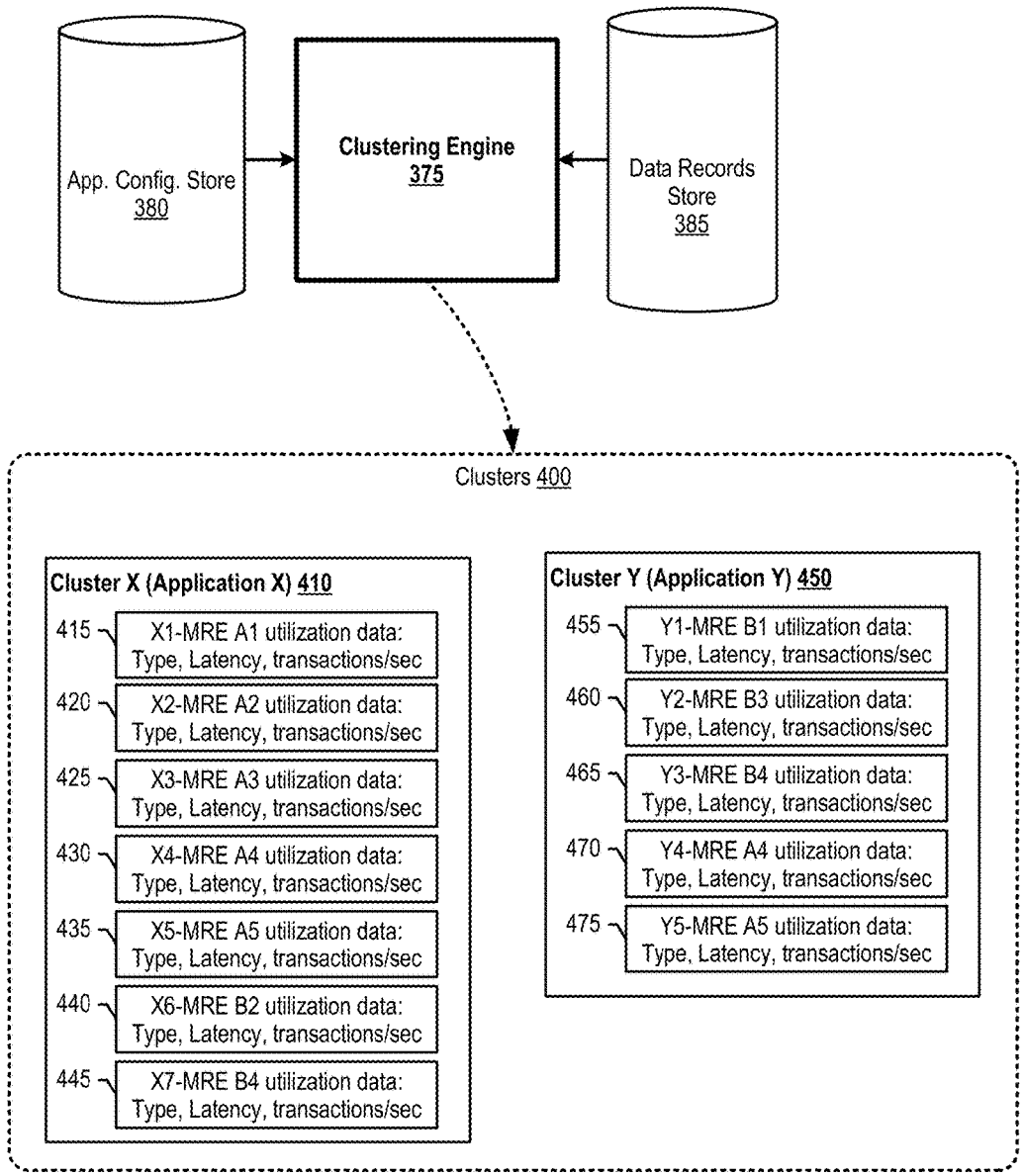
FIG. 4 is an exemplary diagram depicting a clustering engine that groups service data records into clusters based on their corresponding application.
Figure 5:
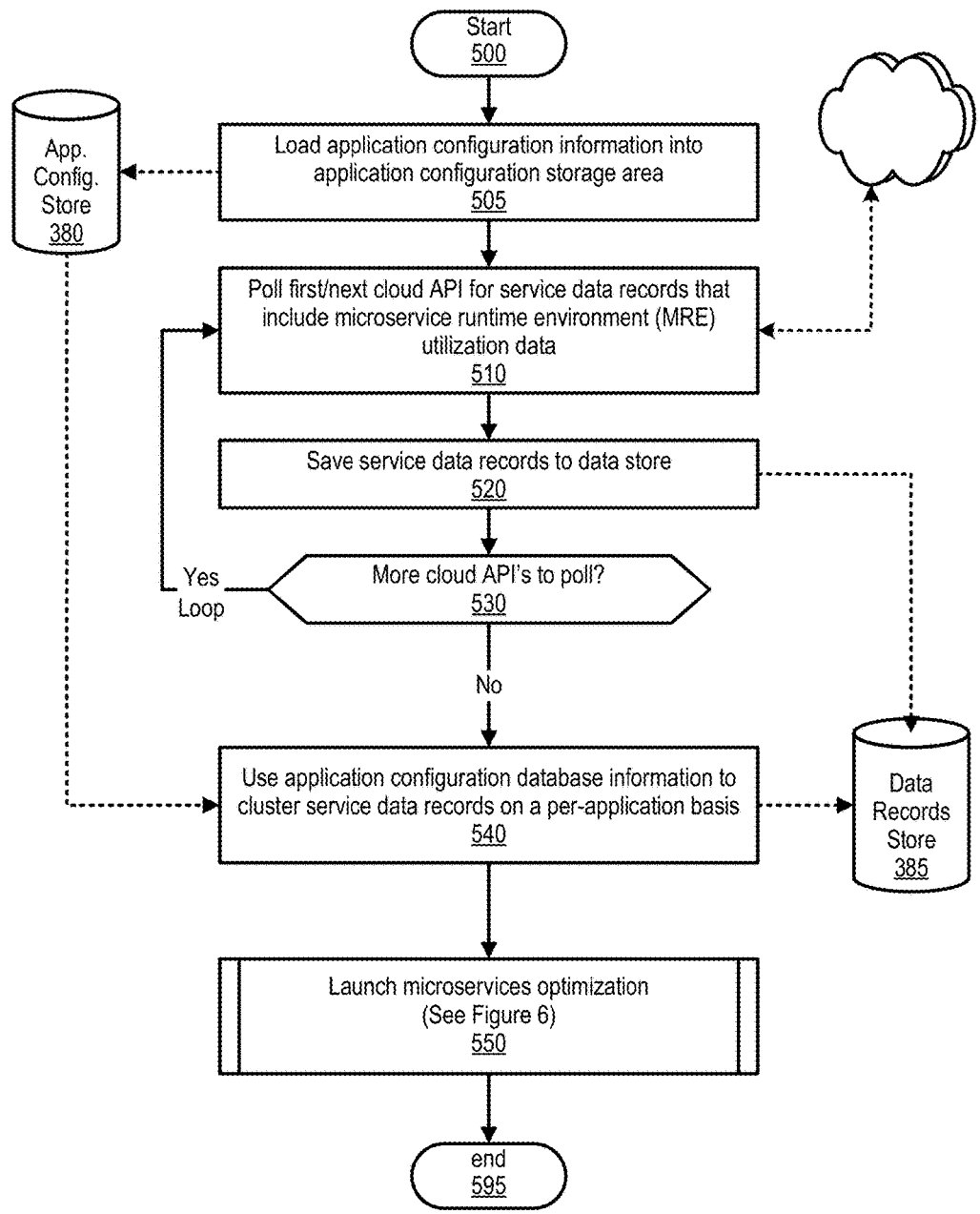
FIG. 5 is an exemplary flowchart showing steps taken by a microservices optimizer system to collect service data records and cluster the service data records on a per application basis.

Clustering engine 375 analyzes the service data records in data records store 385 against the application configuration information in application configuration information 380 to cluster the service data records on a per-application basis (see FIGS. 4-5 and corresponding text for further details). The application configuration information includes which type of MREs are preferred for each of the application's microservices (e.g., database MRE) and which MREs are currently executing the application's microservices. Next, clustering engine 375 analyzes the clustered service data records on a per-application basis to determine whether the application is performing optimally. In one embodiment, clustering engine 375 evaluates the MREs' performance metrics, such as latency, transactions per second, etc., in relation to the locations, site IDs, etc., to determine whether the application is at optimum performance levels.

Clustering engine 375 also checks whether similar type MREs are performing better at other locations. For example, data acquisition engine 370 may collect service data records from a London site that provides a database MRE "us01" having a latency of "L," and also collects service data records from an Amsterdam site that provides a database MRE "us02" having a latency of "A." Based on the microservices grouping and application configuration information, clustering engine 375 may determine that one of application X's microservices is executing on the database us01 MRE but would perform better if it were redeployed to the database us02 MRE and lower overall latencies for application X.

If a change in deployment is identified, clustering engine 375 informs microservices optimizer system 365 and microservices optimizer system 365 sends a message to reporting system 399 to generate a redeployment report and also update application configuration information in application configuration store 380. Microservices optimizer system 365 also sends a message to change management system 390 to generate the change and redeploy the microservice. Change management system 390, in turn, sends instructions to cloud orchestration 395 to implement the change to redeploy particular microservices to different MREs (see FIG. 6 and corresponding text for further details). Continuing with the example above, change management system 390 generates a change record to move one of application X's microservice from the London location to the Amsterdam location.

FIG. 4 is an exemplary diagram depicting a clustering engine that groups service data records into clusters based on their corresponding application. Clustering engine 375 uses application configuration information to identify an application's microservices and MREs on which the microservices are currently deployed. Clustering engine 375 then determines which of the service data records stored in data records store 385 correspond to the application's microservices and MREs.

The example in FIG. 4 shows that clustering engine 375 created two clusters based on the cloud environments shown in FIG. 3. Clusters 400 include cluster X 410 for application X and cluster Y 450 for application Y. Cluster X 410 includes service data records 415, 420, 425, 430, 435, 440, and 445 which correspond to the MREs that are executing microservices x1, x2, x3, x4, x5, x6, and x7. Cluster Y 450 includes service data records 455, 460, 465, 470, and 475, which correspond to the MREs that are executing microservices y1, y2, y3, y4, and y5.

Figure 6:
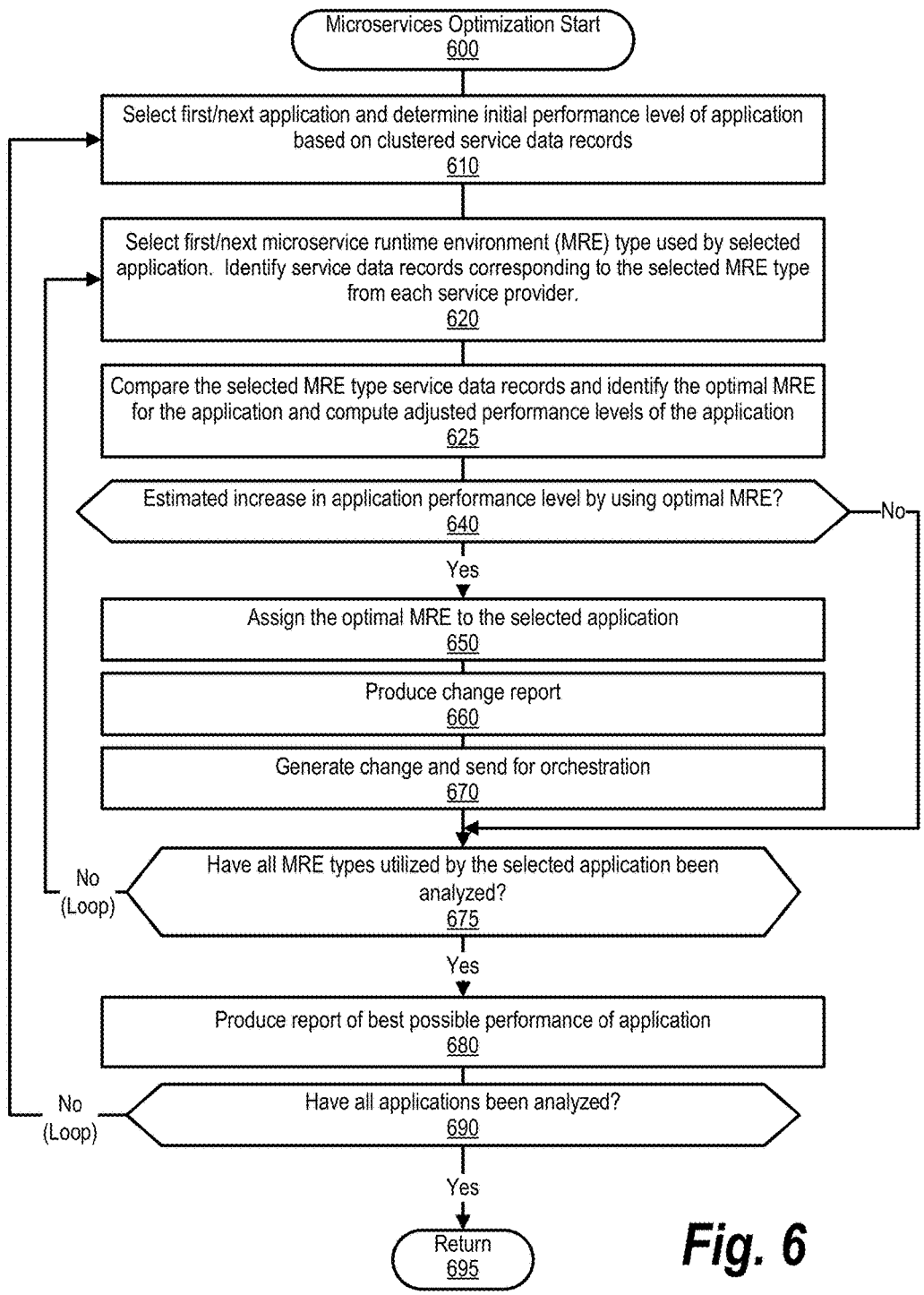
FIG. 6 is an exemplary flowchart showing steps taken to analyze microservice runtime environments (MREs) that are executing application microservices and redeploying the microservices to different MREs as needed to optimize overall application performance.

After clustering engine 375 clusters the service data records into clusters, clustering engine 375 analyzes the service data records at the application performance level to determine whether one or more of the microservices should be deployed to different MREs to increase overall application performance (see FIG. 6 and corresponding text for further details). For example, service data record 475 may indicate high latencies between microservices y1 and y5 due to the location or MRE A5 320. In this example, microservices optimizer system 365 may choose to redeploy y5 to an MRE of the same type offered by cloud B provider (see FIG. 3 and corresponding text for further details).

FIG. 5 is an exemplary flowchart showing steps taken by a microservices optimizer system to collect service data records and cluster the service data records based on application. FIG. 5 processing commences at 500 whereupon, at step 505, the process loads application configuration information into application configuration store 380. The application configuration information includes, for example, each application's microservices and their type (e.g., database microservice, etc.) along with which MREs are currently executing the microservices based on deployment history.

At step 510, the process polls a first cloud API for service data records that include MRE utilization data. For example, the process may receive transactions/second statistics that are correlated with microservices deployment location/subnet/hypervisor. At step 520, the process saves the service data records to service data records store 385 for subsequent clustering and analysis (discussed below). The process determines as to whether there are more cloud API's to poll, such as from different cloud providers (decision 530). If there are more cloud API's to poll, then decision 530 branches to the 'yes' branch which loops back to step 510 to poll the next cloud API for service data records. This looping continues until there are no more cloud API's to poll, at which point decision 530 branches to the 'no' branch exiting the loop.

At step 540, the process uses application configuration information in application configuration store 380 to group service data records on a per-application basis. For example, application X may include microservices x1, x2, x3, x4, and x5, which are being executed by five different MREs. In this example, the process identifies and clusters the five MREs that are executing application X's five microservices.

At predefined process 550, the process performs microservices optimization steps to analyze the MRE's executing the microservices and redeploys the microservices to different MREs as needed to optimize overall application performance (see FIG. 6 and corresponding text for processing details). FIG. 5 processing thereafter ends at 595.

FIG. 6 is an exemplary flowchart showing steps taken to analyze microservice runtime environments (MREs) that are executing application microservices and redeploying the microservices to different MREs as needed to optimize overall application performance.

FIG. 6 processing commences at 600 whereupon step 610, the process selects the first application, such as "Application X," and determines the application's initial performance level based on analyzing the clustered service data records (from FIG. 5) that correspond to the application.

At step 620, the process selects the first microservice runtime environment (MRE) type used by the selected application and identifies service data records corresponding to the selected MRE type from each service provider. For example, the process may detect that Application X utilizes a database MRE type based on its application configuration information, and identifies the service data records corresponding to Application X as well as other service data records, such as from other cloud providers, corresponding to the database MRE type.

At step 625, the process compares performance metrics of the service data records of the selected MRE type and identifies the optimal MRE for the application. For example, the process may identify five database MRE type service data records and identify the service data record and corresponding MRE having the lowest latency metrics if utilized with the application's other microservices. The process then computes an adjusted performance level of the application if the application were to use the optimal MRE instead of the MRE currently in use.

The process determines as to whether there is an estimated increase in the application's performance level by comparing the initial performance level (step 610) against the adjusted performance level (step 625) (decision 640). For example, the selected application may have its database microservice executed by an MRE from Cloud B provider (indicated in the application configuration information) but the process determines that Cloud A provider has an MRE database type with better metrics. In one embodiment, the process determines whether the application currently utilizes the optimal MRE and, if not, the process automatically determines to redeploy microservices to the optimal MRE.

If there is not an estimated increase in performance level, then decision 640 branches to the 'no' branch bypassing microservice redeployment steps for the selected MRE type. On the other hand, if there is an estimate increase in application performance level, then decision 640 branches to the 'yes' branch. At step 650, the process assigns the optimal MRE to the selected application and, at step 660, the process produces a change report that indicates the optimal MRE to which the microservice should be redeployed.

At step 670, the process generates a change and sends the change to change management system 375 and eventually to cloud orchestration system 395 for orchestration, which redeploys application A's microservice to the optimal MRE. In one embodiment, change management system 375 tracks the changes while cloud orchestration system 395 executes the microservices redeployment.

The process determines as to whether all of the MRE types utilized by the selected application have been analyzed (decision 675). If all of the MRE types utilized by the selected application have not been analyzed, then decision 675 branches to the 'no' branch which loops back to select and process the next MRE type. This looping continues until each of the MRE types utilized by the selected application are analyzed, at which point decision 675 branches to the 'yes' branch exiting the loop. At step 680, the process produces a report of the best estimated of the selected application that includes, for example, the best performance combination from the set of possible microservices.

The process determines as to whether all of the applications have been analyzed (decision 690). If all of the applications have not been analyzed, then decision 690 branches to the 'no' branch, which loops back to select and analyze the next application. This looping continues until each of the applications have been analyzed, at which point decision 690 branches to the 'yes' branch exiting the loop. FIG. 6 processing thereafter returns to the calling routine (see FIG. 5) at 695.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    deploying a first microservice to a first microservice runtime environment (MRE), wherein the first microservice is part of a plurality of microservices included in an application and depends upon a second microservice included in the plurality of microservices;
    clustering a set of service data records based on the plurality of microservices, wherein the clustered set of service data records includes a first service data record comprising a first latency time between the first microservice and the second microservice;
    determining an initial performance level of the application based on the first latency time;
    evaluating a different set of service data records corresponding to an MRE type of the first microservice;
    selecting a second service data record from the different set of service data records based on the evaluation, wherein the second service data record comprises a second latency time corresponding to a second MRE;
    computing an adjusted performance level of the application based on the second latency time; and
    redeploying the first microservice from the first MRE to the second MRE based on determining that the adjusted performance level is an improvement over the initial performance level.

2. The method of claim 1 further comprising:
    collecting the set of service data records from one or more service providers.

3. The method of claim 1 wherein:
    a first set of MREs are provided by a first service provider and a second set of MREs are provided by a second service provider; and
    the first MRE is included in the first set of MREs and the second MRE is included in the second set of MREs.

4. The method of claim 1 wherein the deploying further comprises:
    deploying each of the plurality of microservices to one of a plurality of MREs, wherein the second MRE is not included in the plurality of MREs.

5. An information handling system comprising:
    one or more processors;
    a memory coupled to at least one of the processors; and
    a set of computer program instructions stored in the memory and executed by at least one of the processors in order to perform actions of:
        deploying a first microservice to a first microservice runtime environment (MRE), wherein the first microservice is part of a plurality of microservices included in an application and depends upon a second microservice included in the plurality of microservices;
        clustering a set of service data records based on the plurality of microservices, wherein the clustered set of service data records includes a first service data record comprising a first latency time between the first microservice and the second microservice;
        determining an initial performance level of the application based on the first latency time;
        evaluating a different set of service data records corresponding to an MRE type of the first microservice;
        selecting a second service data record from the different set of service data records based on the evaluation, wherein the second service data record comprises a second latency time corresponding to a second MRE;
        computing an adjusted performance level of the application based on the second latency time; and
        redeploying the first microservice from the first MRE to the second MRE based on determining that the adjusted performance level is an improvement over the initial performance level.

6. The information handling system of claim 5 wherein at least one of the one or more processors perform additional actions comprising:
    collecting the set of service data records from one or more service providers.

7. The information handling system of claim 5 wherein:
    a first set of MREs are provided by a first service provider and a second set of MREs are provided by a second service provider; and
    the first MRE is included in the first set of MREs and the second MRE is included in the second set of MREs.

8. The information handling system of claim 5 wherein, during the deploying, at least one of the one or more processors perform additional actions comprising:
    deploying each of the plurality of microservices to one of a plurality of MREs, wherein the second MRE is not included in the plurality of MREs.

9. A computer program product stored in a computer readable storage medium, comprising computer program code that, when executed by an information handling system, causes the information handling system to perform actions comprising:
    deploying a first microservice to a first microservice runtime environment (MRE), wherein the first microservice is part of a plurality of microservices included in an application and depends upon a second microservice included in the plurality of microservices;
    clustering a set of service data records based on the plurality of microservices, wherein the clustered set of service data records includes a first service data record comprising a first latency time between the first microservice and the second microservice;
    determining an initial performance level of the application based on the first latency time;
    evaluating a different set of service data records corresponding to an MRE type of the first microservice;
    selecting a second service data record from the different set of service data records based on the evaluation, wherein the second service data record comprises a second latency time corresponding to a second MRE;
    computing an adjusted performance level of the application based on the second latency time; and redeploying the first microservice from the first MRE to the second MRE based on determining that the adjusted performance level is an improvement over the initial performance level.

10. The computer program product of claim 9 wherein the information handling system performs additional actions comprising:

collecting the set of service data records from one or more service providers.

* * * * *